US009916724B2

(12) United States Patent
Bennett et al.

(10) Patent No.: US 9,916,724 B2
(45) Date of Patent: Mar. 13, 2018

(54) GAMING MACHINE FEATURE

(71) Applicant: Aristocrat Technologies Australia Pty Limited, North Ryde, NSW (AU)

(72) Inventors: Nicholas Luke Bennett, Lane Cove (AU); Natalie Bryant, Lane Cove (AU); Peter Stathis, Castle Hill (AU)

(73) Assignee: ARISTOCRAT TECHNOLOGIES AUSTRALIA PTY LTD (AU)

( * ) Notice: Subject to any disclaimer, the term of this patent is extended or adjusted under 35 U.S.C. 154(b) by 0 days.

(21) Appl. No.: 15/175,650

(22) Filed: Jun. 7, 2016

(65) Prior Publication Data

US 2016/0292968 A1 Oct. 6, 2016

Related U.S. Application Data

(63) Continuation of application No. 11/561,873, filed on Nov. 20, 2006, now Pat. No. 9,367,986, which is a (Continued)

(30) Foreign Application Priority Data

Mar. 17, 2000 (AU) ...................................... PQ6297

(51) Int. Cl.
*A63F 9/24* (2006.01)
*A63F 13/00* (2014.01)
(Continued)

(52) U.S. Cl.
CPC .......... *G07F 17/3244* (2013.01); *G07F 17/32* (2013.01); *G07F 17/3211* (2013.01); *G07F 17/3213* (2013.01); *G07F 17/34* (2013.01)

(58) Field of Classification Search
CPC .. G07F 17/32; G07F 17/3244; G07F 17/3211; G07F 17/3213; G07F 17/34
(Continued)

(56) References Cited

U.S. PATENT DOCUMENTS 5,275,400 A 1/1994 Weingardt et al.
5,277,424 A * 1/1994 Wilms .................... G07F 17/32 273/274
(Continued)

FOREIGN PATENT DOCUMENTS

EP 0373801 6/1990
EP 0448013 9/1991

OTHER PUBLICATIONS

International Search Report, PCT/AU01/00188 dated Apr. 19, 2001.
(Continued)

*Primary Examiner* — Omkar Deodhar
*Assistant Examiner* — Wei Lee
(74) *Attorney, Agent, or Firm* — McAndrews, Held & Malloy, Ltd.

(57) ABSTRACT

A gaming machine (10) has a display (14) and a game controller arranged to control images displayed on the display (14). The game controller is arranged to play a game wherein one or more random events arc caused to be displayed on the display (14) and, if a predefined winning event results, the machine (10) awards a prize which is credited to a credit meter of the machine (10). The credit meter includes two meter displays, a first meter display (42.1) indicating credit which is available for expenditure in the machine (10) to play at least one game and a second meter display (42.2) indicating credit set aside by at least one of a player and the game controller and which credit is unavailable to the player for wagering on a game but which is only available by termination of a playing session.

20 Claims, 10 Drawing Sheets

Related U.S. Application Data continuation of application No. 10/204,074, filed as application No. PCT/AU01/00188 on Feb. 23, 2001, now Pat. No. 8,070,576.

(51) Int. Cl.

| | |
|---|---|
| ***G06F 17/00*** | (2006.01) |
| ***G06F 19/00*** | (2011.01) |
| ***G07F 17/32*** | (2006.01) |
| ***G07F 17/34*** | (2006.01) |

(58) Field of Classification Search

USPC .................................................... 463/16, 20

See application file for complete search history.

(56) References Cited

U.S. PATENT DOCUMENTS

| | | | |
|---|---|---|---|
| 5,470,079 | A | 11/1995 | LeStrange et al. |
| 5,511,781 | A | 4/1996 | Wood et al. |
| 5,539,450 | A | 7/1996 | Handelman |
| 5,603,659 | A | 2/1997 | Okada |
| 5,779,547 | A | 7/1998 | SoRelle et al. |
| 5,882,259 | A | 3/1999 | Holmes et al. |
| 5,967,894 | A | 10/1999 | Kinoshita et al. |
| 5,967,896 | A | 10/1999 | Jorasch et al. |
| 6,062,981 | A | 5/2000 | Luciano, Jr. |
| 6,089,979 | A | 7/2000 | Klein |
| 6,159,098 | A | 12/2000 | Siomiany et al. |
| 6,168,522 | B1 * | 1/2001 | Walker .................... G07F 17/32 463/20 |
| 6,227,972 | B1 | 5/2001 | Walker et al. |
| 6,322,445 | B1 | 11/2001 | Miller |
| 6,379,248 | B1 | 4/2002 | Jorasch et al. |
| 6,508,709 | B1 | 1/2003 | Karmarkar |
| 6,511,377 | B1 | 1/2003 | Weiss |
| 6,547,131 | B1 | 4/2003 | Foodman et al. |
| 6,607,441 | B1 | 8/2003 | Acres |
| 6,629,890 | B2 | 10/2003 | Johnson |
| 2001/0031663 | A1 | 10/2001 | Johnson |
| 2002/0002075 | A1 | 1/2002 | Rowe |
| 2002/0142844 | A1 | 10/2002 | Kerr |

OTHER PUBLICATIONS

Wagner, Dan. Human Factors Design Guide (Springfield, Virginia, 1996), pp. 8-1 & 8-4.

Decision on Appeal re U.S. Appl. No. 10/204,074, dated Sep. 3, 2010.

* cited by examiner

GAMING MACHINE FEATURE

RELATED APPLICATIONS

This application is a continuation of U.S. application Ser. No. 11/561,873, filed Nov. 20, 2006, expected to issue as U.S. Pat. No. 9,367,986 on Jun. 14, 2016, which is a continuation of U.S. application Ser. No. 10/204,074, filed Oct. 10, 2002, issued as U.S. Pat. No. 8,010,576 on Dec. 6, 2011, which is the national stage filing under 35 U.S.C. 371 of International Application PCT/AU01/00188, filed on Feb. 23, 2001, which claims the benefit of Australian Patent Application PQ 6297, filed on Mar. 17, 2000, all of which are herein incorporated by reference in their entirety.

FIELD OF THE INVENTION

This invention relates to a gaming machine. More particularly, the invention relates to a gaming machine and to an improved meter arrangement for such a gaming machine.

BACKGROUND TO THE INVENTION

Gaming machines are becoming increasingly popular. In certain quarters, concerns are being expressed about the expenditure of funds on gaming machines.

SUMMARY OF THE INVENTION

According to the invention there is provided a gaming machine having a display means and a game control means arranged to control images displayed on the display means, the game control means being arranged to play a game wherein one or more random events are caused to be displayed on the display means and, if a predefined winning event results, the machine awards a prize which is credited to a credit meter of the machine, the gaming machine being characterized in that the credit meter includes two meter displays, a first meter display indicating credit which is available for expenditure in the machine to play at least one game and a second meter display indicating credit set aside by at least one of a player and the game control means and which credit is unavailable to the player for wagering on a game but which is only available by termination of a playing session.

For the sake of explanation, the second meter display will be referred to as a bank credit meter or, more simply, as a bank meter. Credit displayed on the bank meter can never be used for making wagers but can only be collected from the gaming machine upon termination of a playing session.

In one aspect, the game control means may credit excess credit to the bank meter where the player tenders credit and only a part of the tendered credit is to be used for wagering by the player. The crediting of excess credit to the bank meter may be made at the selection of the player or may be forced by the game control means of the gaining machine.

Thus, in one embodiment of this aspect of the invention, the gaming machine may include a transfer device for transferring excess credit to the bank meter. The transfer device may be a "bank" button to transfer credit from the credit meter to the bank meter. Hence, for example, should a player wish to gamble with less than an amount of money that the player has inserted into the machine, the player can transfer a portion of these funds via the bank button to the bank meter.

In another embodiment of this aspect of the invention, the game control means may automatically transfer excess credit, beyond a predetermined threshold as contained in the game control means, to the bank meter without player intervention.

In another aspect of the invention, the game control means may credit wins from games played to the bank meter instead of the first meter display, which is the normal credit meter. This may be referred to as an autobank mode.

Further, the game control means may credit wins to the bank meter automatically or at the option of the player. In the latter case, the player may be able to set a limit above which wins are credited to the bank meter and below which wins are credited to the first meter display. The limit may be set via an appropriate setting device operated by the player. The setting device may be an autobank button which is toggled by the player to set the limit.

In use, when the player activates the autobank button to bank the player's wins, any wins resulting are automatically credited to the bank meter rather than to the credit meter. Funds credited to the bank meter are then only available to the player upon termination of a gaming session. A gaming session may be regarded as having terminated either when the credit on the credit meter is zero or when the player has cashed out credit displayed on the first meter display resulting in a zero balance on the first meter display. Thereafter, any credits remaining in the bank meter may be cashed out.

The gaming machine may include a discernible warning device to warn a player, upon termination of a gaming session, to cash out from the bank meter. The discernible warning device may be an audible and/or a visual warning device. The player may be unable to cancel the discernible warning device by entering more credit into the gaming machine. In other words, the credit standing to the player in the bank meter must be collected by the player before the gaming machine can accept more credit.

BRIEF DESCRIPTION OF THE DRAWINGS

The invention is now described by way of example with reference to the accompanying diagrammatic drawings in which.

DETAILED DESCRIPTION OF THE DRAWINGS

Figure 1:
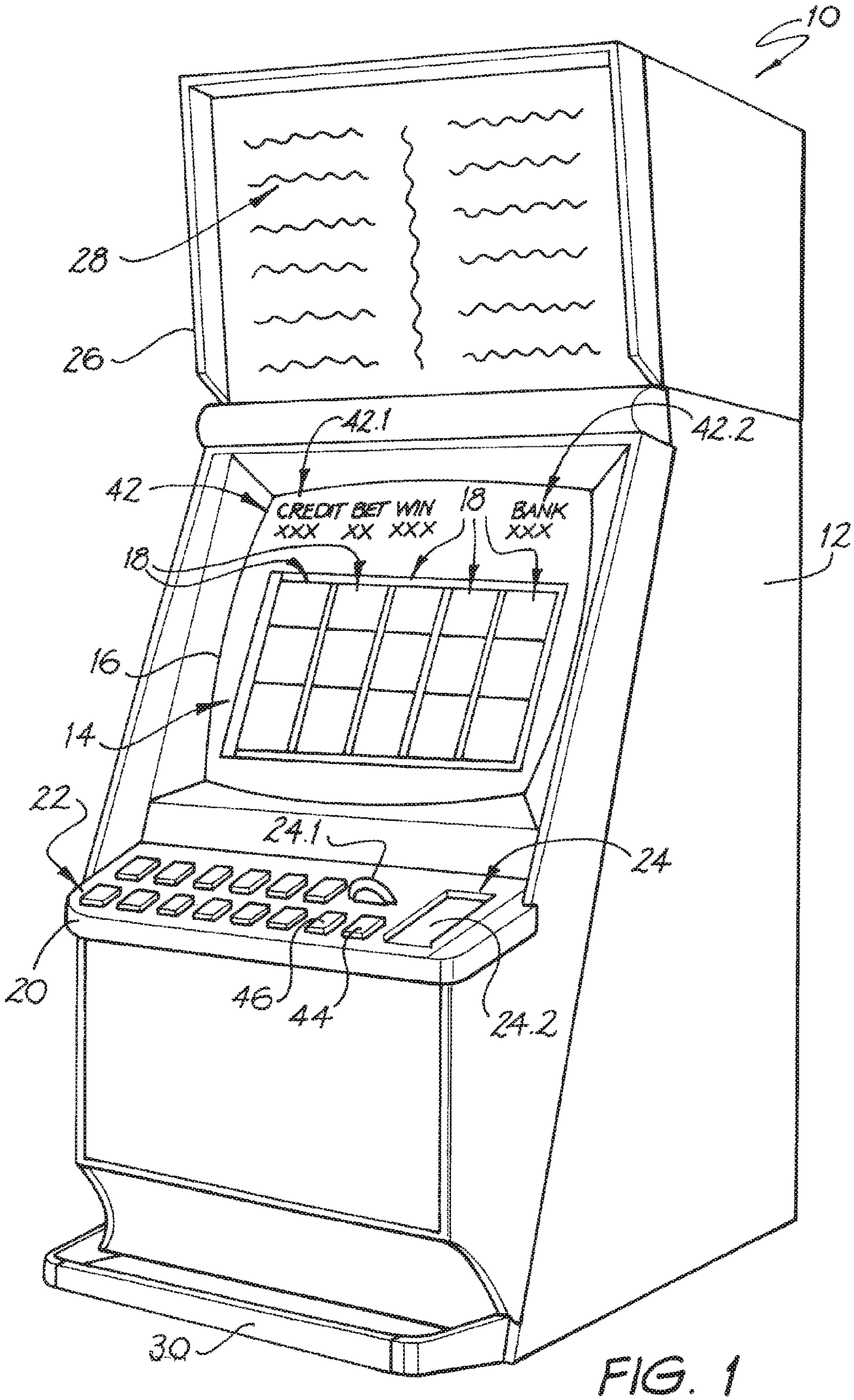
FIG. 1 shows a three dimensional view of a gaming machine, in accordance with the invention.

In FIG. 1, reference numeral 10 generally designates a gaming machine, including a game, in accordance with the invention. The machine 10 includes a console 12 having a video display unit 14 on which a game 16 is played, in use. The game 16 is a spinning reel game which simulates the rotation of a number of spinning reels 18. It will, however, be appreciated that the invention applies to other games as well such as card games, ball-type games like keno, or the like. A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
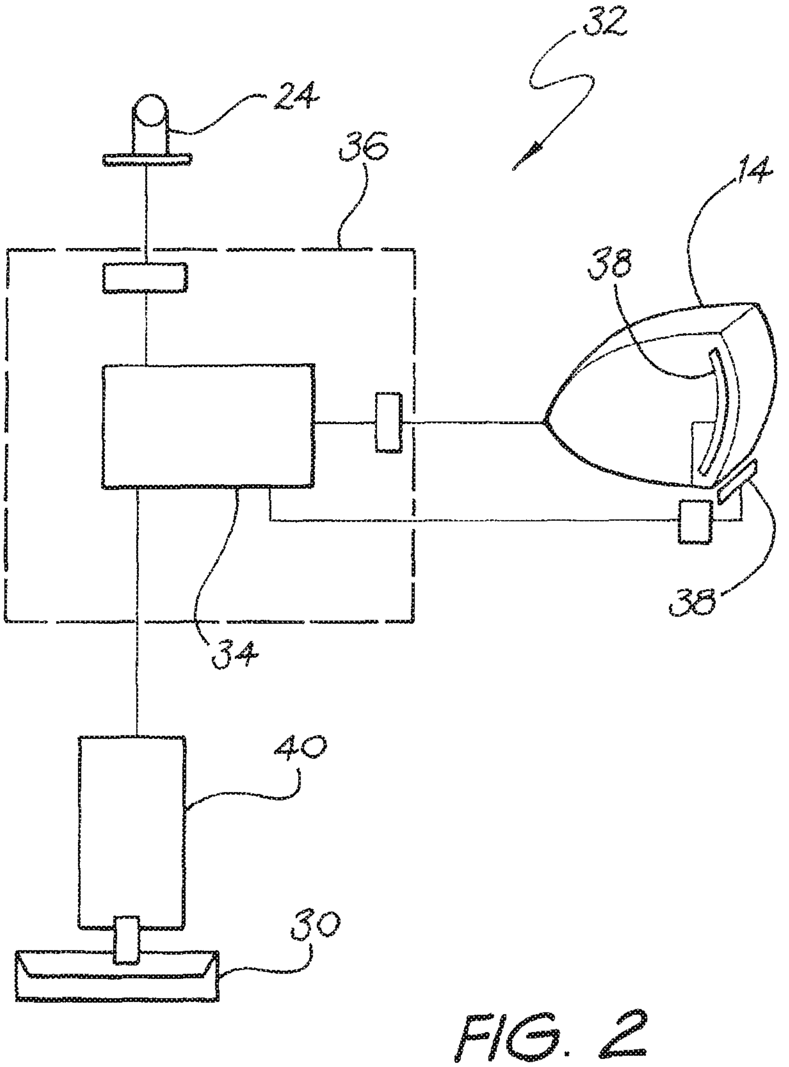
FIG. 2 shows a schematic block diagram of a control circuit of the gaming machine.

Referring now to FIG. 2 of the drawings, a control means or control circuit 32 is illustrated. A program which implements the game and user interface is run on a processor 34 of the control circuit 32. The processor 34 forms part of a controller 36 which drives the screen of the video display unit 14 and which receives input signals from sensors 38. The sensors 38 include sensors associated with the bank 22 of buttons and touch sensors mounted in the screen. The controller 36 also receives input pulses from the mechanism 24 indicating that a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 36 drives a payout mechanism 40 which, for example, may be a coin hopper for feeding coins to the coin tray 30 to make a pay out to a player when the player wishes to redeem his or her credit standing to a credit meter 42.1 and/or to a bank meter 42.2 of a credit meter display 42 of the gaming machine 10 as will be described in greater detail below.

In this invention, the credit meter display 42 of the gaming machine 10 is displayed on the screen of the video display unit 14. The credit meter display 42 has two components, the standard credit meter 42.1 and the bank meter 42.2 which constitute separate displays on the screen of the video display unit 14.

Also, a "bank" button 44 is arranged on the midtrim 20 of the gaming machine 10. Still further, an "autobank" button 46 is also arranged on the midtrim 20 of the machine 10. It will be appreciated that, instead of the buttons 44 and 46, these features may be implemented as touch screen features on the screen of the video display unit 14.

The purpose of the split credit meter 42 is to encourage responsible gaming. The bank meter 42.2 gives the player the option to bank any portion of the player's winnings or wagers. Money available on the credit meter 42.1 of the credit meter display 42 may be wagered in the normal way but that money credited to the bank meter 42.2 can never be wagered from the bank meter 42.2 but can only be collected from the gaming machine 10 by cashing out.

Two scenarios are envisaged where the bank meter 42.2 will mostly be used. These scenarios are, firstly, where the player uses a large denomination note or coin but only wishes to use a portion of the money credited to the machine. The second scenario is where a win is paid to the bank meter 42.2 instead of to the credit meter 42.1.

By means of the bank button 44 (or its touch screen equivalent) the player can transfer money from the credit meter 42.1 to the bank meter 42.2.

Thus, when a player inserts cash into the machine this will be displayed on the credit meter 42.1 in the conventional fashion. Whenever the gaming machine 10 is in idle mode (which includes immediately after credit is inserted into the game machine) the player will be able to press the bank button 44 to transfer credit from the credit meter 42.1 to the bank meter 42.2. The preferred embodiment is for the bank button 44 to work as a toggle transferring credits of predetermined amounts from the credit meter 42.1 to the credit meter 42.2 each time the button 44 is activated.

The size of the amount which is transferred each time the button 44 is activated may be operator selectable and may also be dependent upon the denomination of the gaming machine 10. Hence, a player may insert fifty dollars into the gaming machine with the intention of betting no more than twenty dollars. The credit transfer amount applicable to the gaming machine 10 when the button 44 is manipulated may be five dollars. Hence, by pressing the bank button 44 six times, thirty dollars is transferred to the bank meter 42.2 from the credit meter 42.1. Only twenty dollars remains on the credit meter 42.1 with which the player can bet. Once the twenty dollars has been depleted, assuming winnings are credited to the bank meter 42.2, the credit meter 42.1 will have been depleted and a warning message and sound will occur reminding the player to collect the banked credits, as displayed on the bank meter 42.2, before leaving the machine 10. The sound and message will be cancelled by pressing the "Collect" button of the machine 10 resulting in all credits credited to the bank meter 42.2, including the original thirty dollars, being paid out to the player in the applicable fashion. It is preferred that the player will not be able to cancel the warning message and sound by inserting more credit into the gaming machine 10. In other words, the bank meter 42.2 must be cleared by being collected before the gaming machine 10 will be able to accept more credit.

The bank button 44 may be operable at any time when the gaming machine 10 is in an idle mode. Hence, after a win has been transferred to the credit meter display 42, whether to the credit meter 42.1 or to the bank meter 42.2, the player may again decide to move some or all of the current credit on the credit meter 42.1 to the bank meter 42.2. This is done by appropriation manipulation of the bank button 44.

In another embodiment of this scenario or aspect of the invention, the gaming machine 10 selects a maximum amount of money that can be credited to the credit meter 42.1 at any one time. —For example, the machine 10 may set a maximum limit of twenty dollars to appear on the credit meter 42.1 at any one time. As a result, if a player inserts more than the maximum allowable amount, the credit meter 42.1 is credited with whatever part of the entered amount is required to take the credit meter 42.1 to its maximum amount. The balance is transferred by the machine to the bank meter 42.2. Assuming the player inserts fifty dollars and the balance on the credit meter had been zero, then, if the maximum permissible amount which can be displayed on the credit meter 42.1 is twenty dollars, the balance of thirty dollars will be transferred to the bank meter 42.2 by the machine 10. In this embodiment, it also envisaged that all winnings will be transferred directly to the bank meter 42.2 automatically and without any player intervention. Hence, the bank button 44 may be eliminated.

It is also preferred that all winnings are banked to the bank meter 42.2 rather than to the credit meter 42.1 but this will be at the option of the player.

In one embodiment, the machine 10 includes the autobank button 48 or its touch screen equivalent. When the autobank button 48 is activated, any wins payable to the player 42.2 as a result of playing the game 16 will be credited to the bank meter 42.2 rather than to the credit meter 42.1. Thus, the player can only access the winnings by terminating a gaming session on the gaming machine 10 and collecting the funds in the applicable fashion.

The autobank button 48 may also be applicable together with a limit. Whenever the player toggles the button 48, from an "off" to an "on" state, they will be able to define the limit. Then, when any win equals or exceeds the set limit, this win is transferred to the bank meter 42.2. Any wins lower than the limit are transferred to the credit meter 42.1.

Still further, instead of the button 48, whenever a win occurs, the standard "play on, gamble or take win" message will be augmented by a "bank" message. If the player then presses the bank button 44 at this point, the win just obtained will be transferred to the bank meter 42.2 rather than to the credit meter 42.1.

The banking feature may be provided in combination with other features of the gaming machine 10. Hence, for example, a spin/bank button (or similar) could be provided which automatically banks all wins in combination with the other feature. Hence, if a player wishes to alter their bet or have wins transferred to the credit meter 42.1 the player will press the standard play line button (or whichever applicable button) to commence games as per normal operation of the machine 10. By pressing the spin/bank button (not shown) a game will commence at the current bet per line and the previous game's number of lines. Any wins resulting from playing the machine 10 will automatically be credited to the bank meter 42.2.

Referring now to FIGS. 3*a* to 3*j* of the drawings, examples of the invention are illustrated.

Figure 3A:
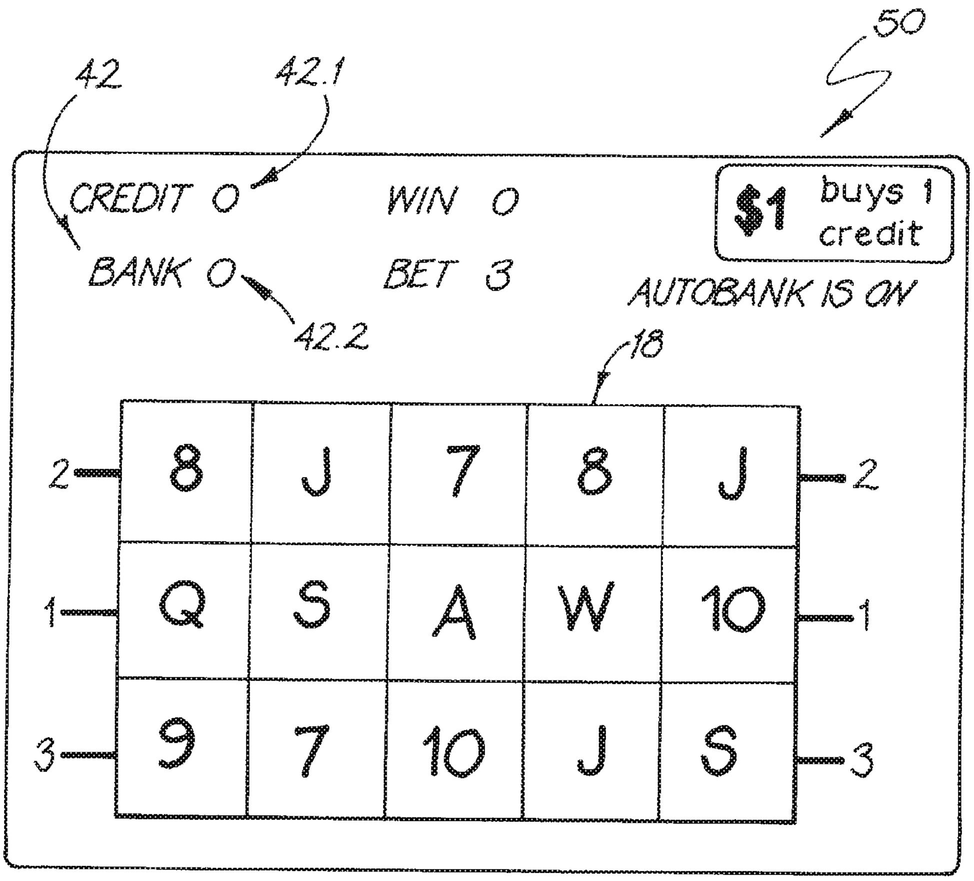
FIGS. 3*a* to 3*j* show screen displays of various examples of the invention.

Prior to commencement of the game, a screen display on the video display unit 14 of the machine is shown at 50 in FIG. 3*a*. The credit meter 42.1 and the bank meter 42.2 are both set at zero.

Figure 3B:
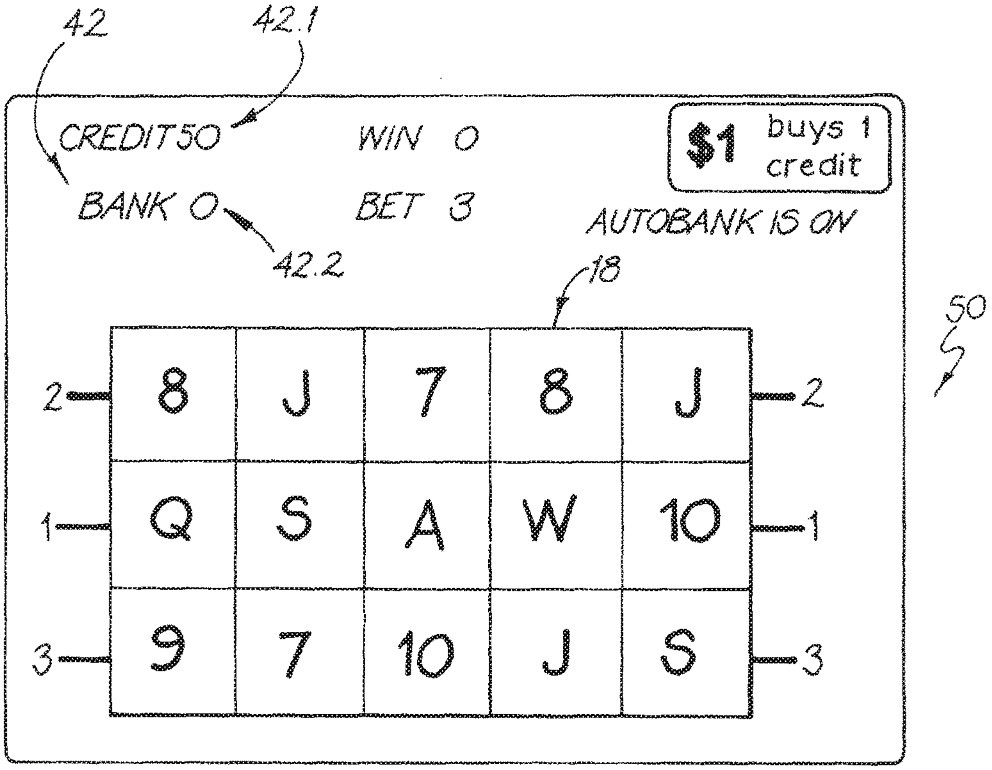
Figure 3C:
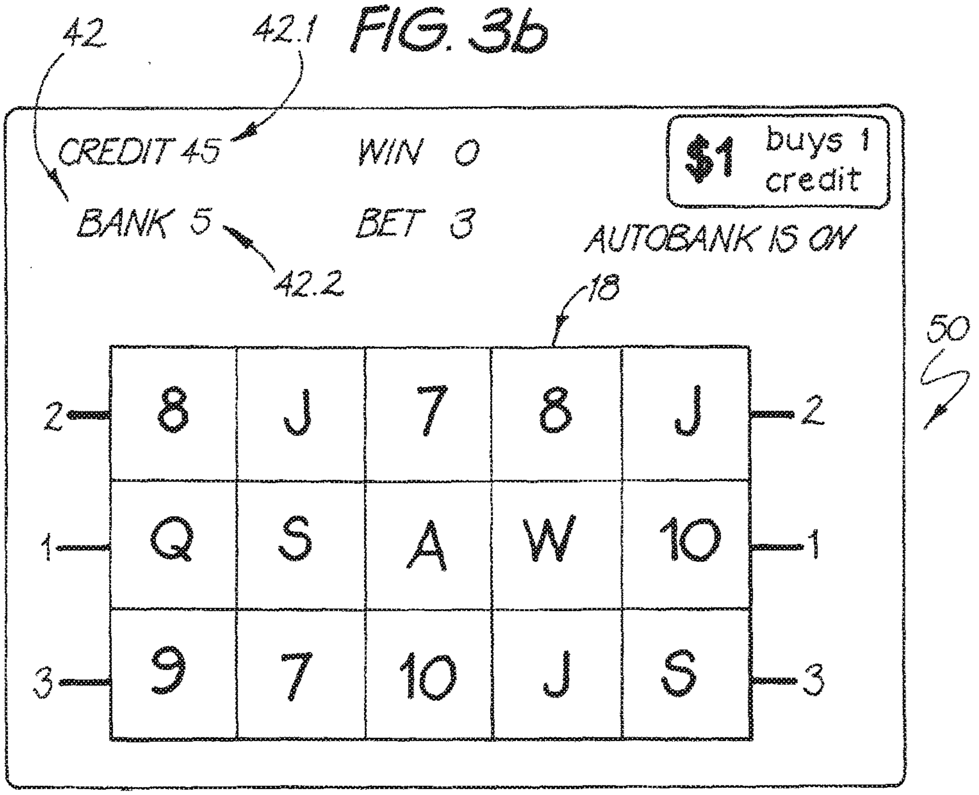

A player inserts a fifty dollar note via the bill acceptor 24.2. This is monitored by the mechanism 24 and the processor 32 and the credit meter 42.1 is credited as shown in FIG. 3*b* of the drawings.

Figure 3D:
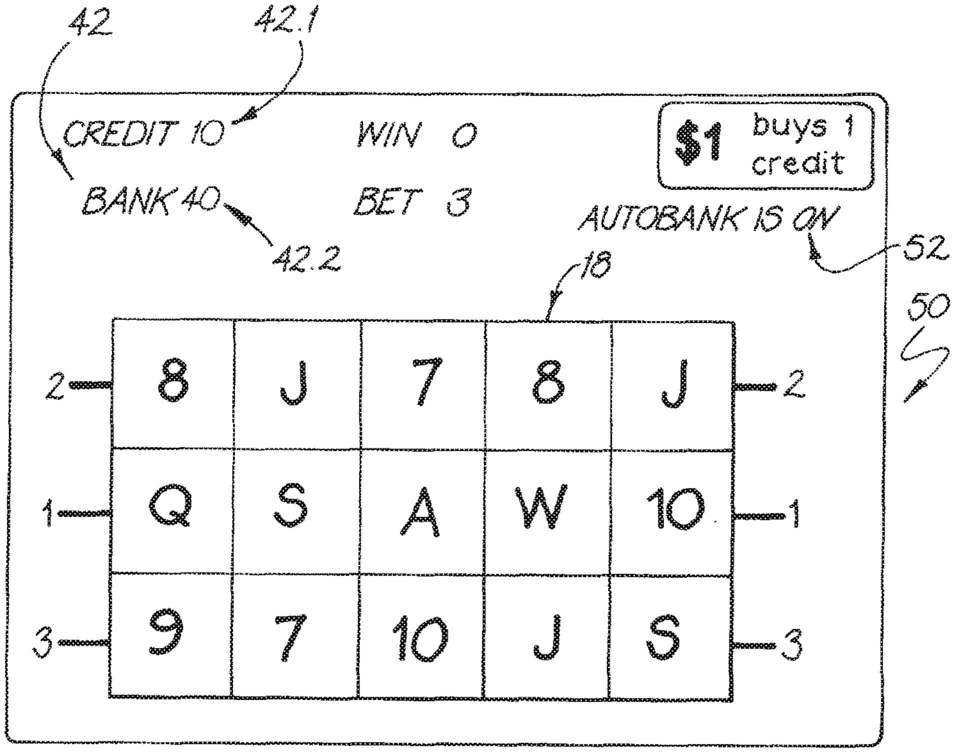
Figure 3E:
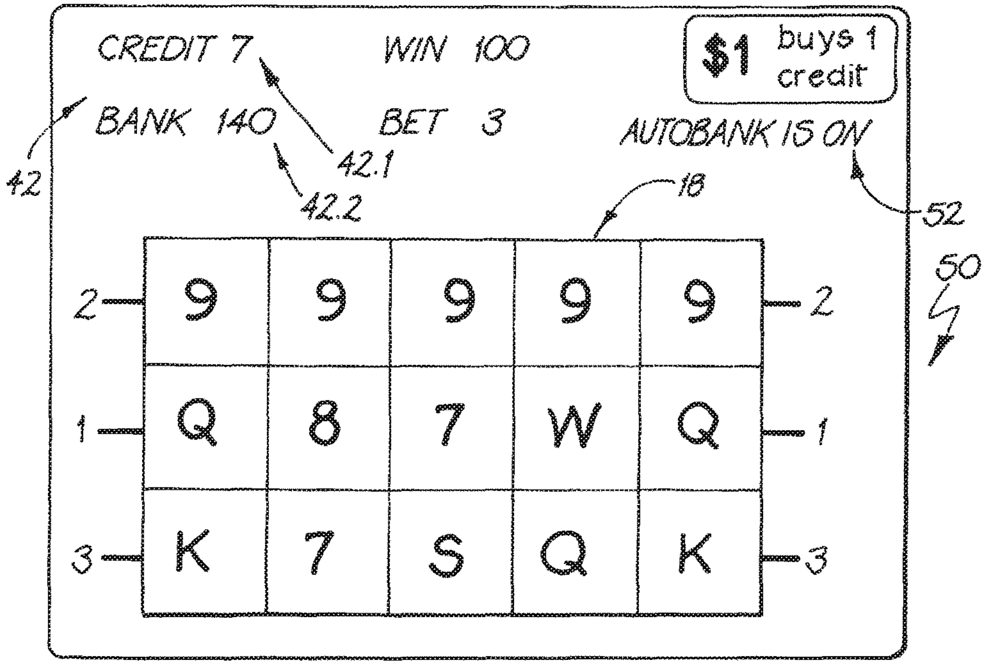

The player only wishes to bet ten dollars of the fifty dollars credited so the player presses the bank button 44 eight times. As shown, after the first press of the button 44 in FIG. 3*c* of the drawings, each time the button 44 is pressed, five dollars are transferred from the credit meter 42.1 to the bank meter 42.2 until forty dollars has been credited to the bank meter 42.2 and only an amount of ten dollars remains on the credit meter 42.1 as illustrated in FIG. 3*d* of the drawings.

The player then bets one credit per line on all three paylines. As a result of achieving five nines on payline two, a win of one hundred credits results. Due to the fact that the autobank button 46 is on, as illustrated by a message 52 on the screen 50, the one hundred credits for the win are credited to the bank meter 42.2.

Figure 3F:
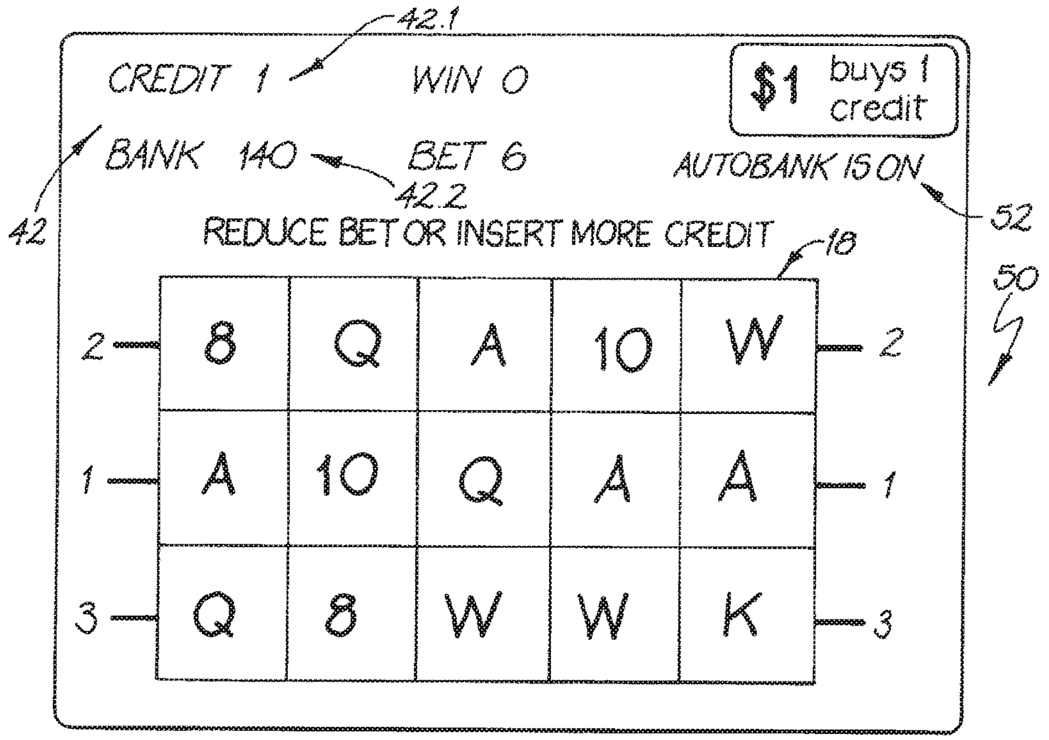
Figure 3G:
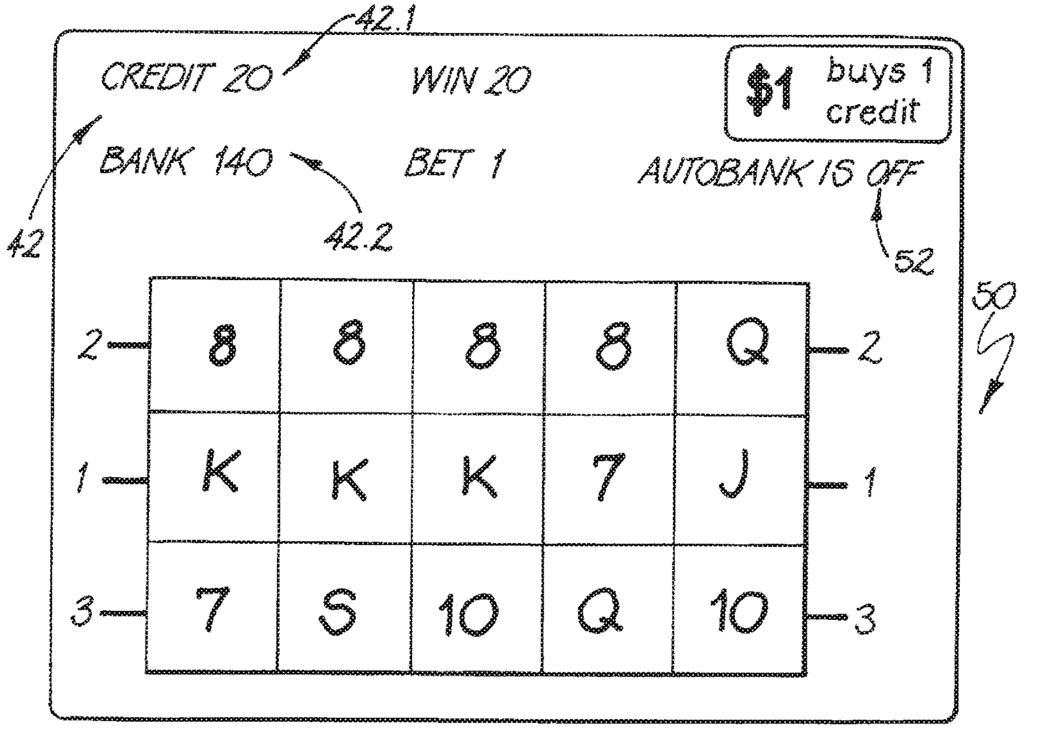
Figure 3H:
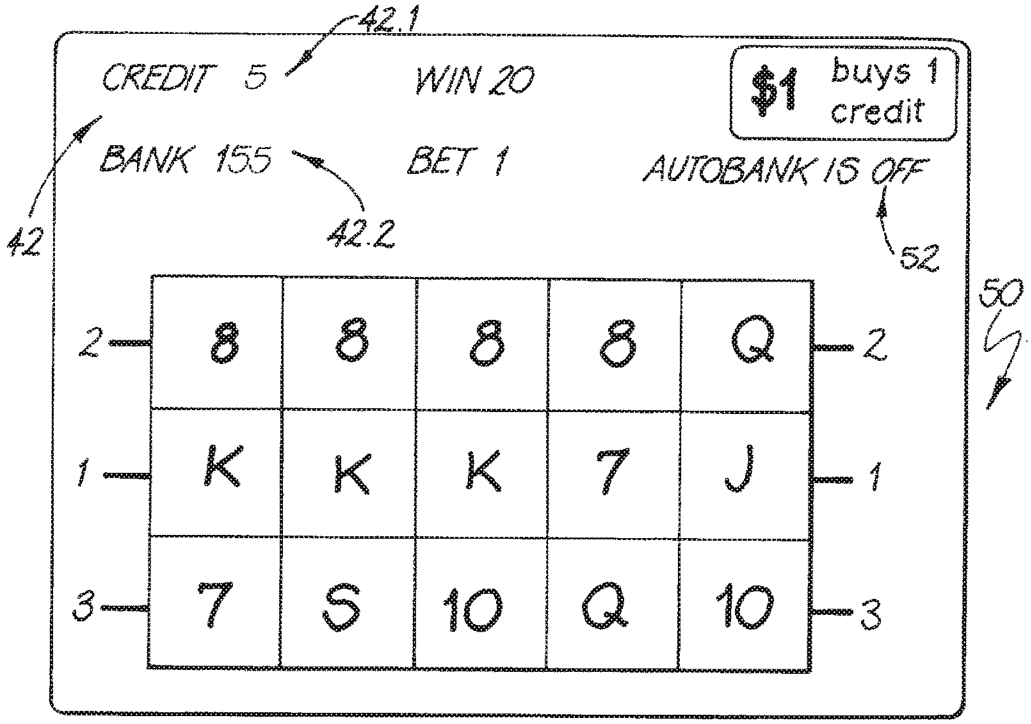
Figure 3I:
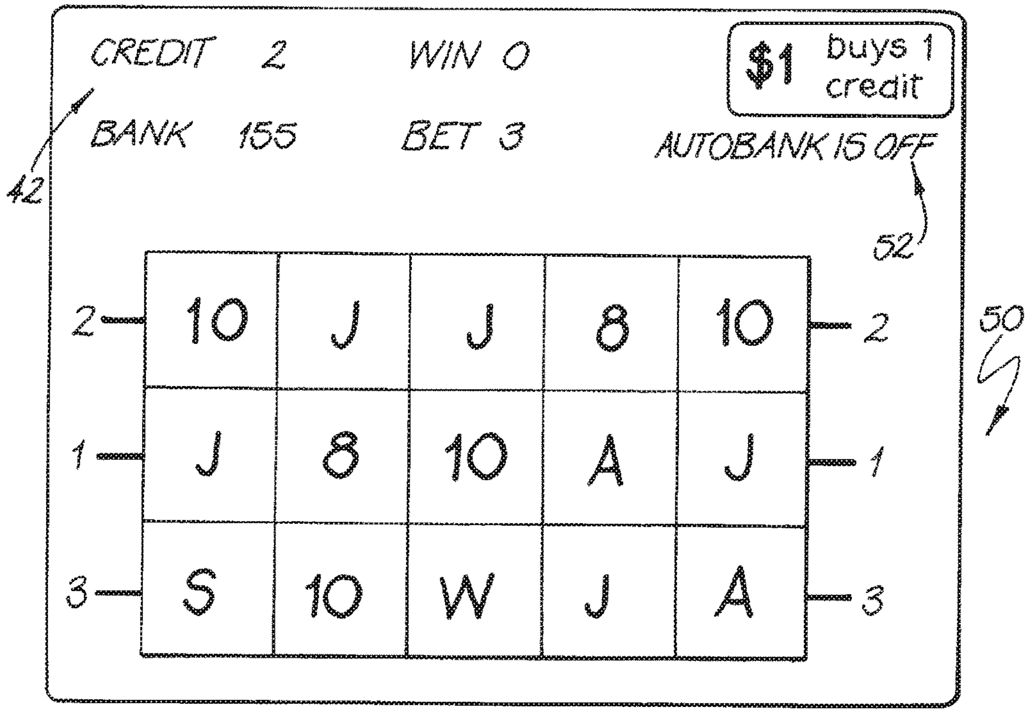
Figure 3J:
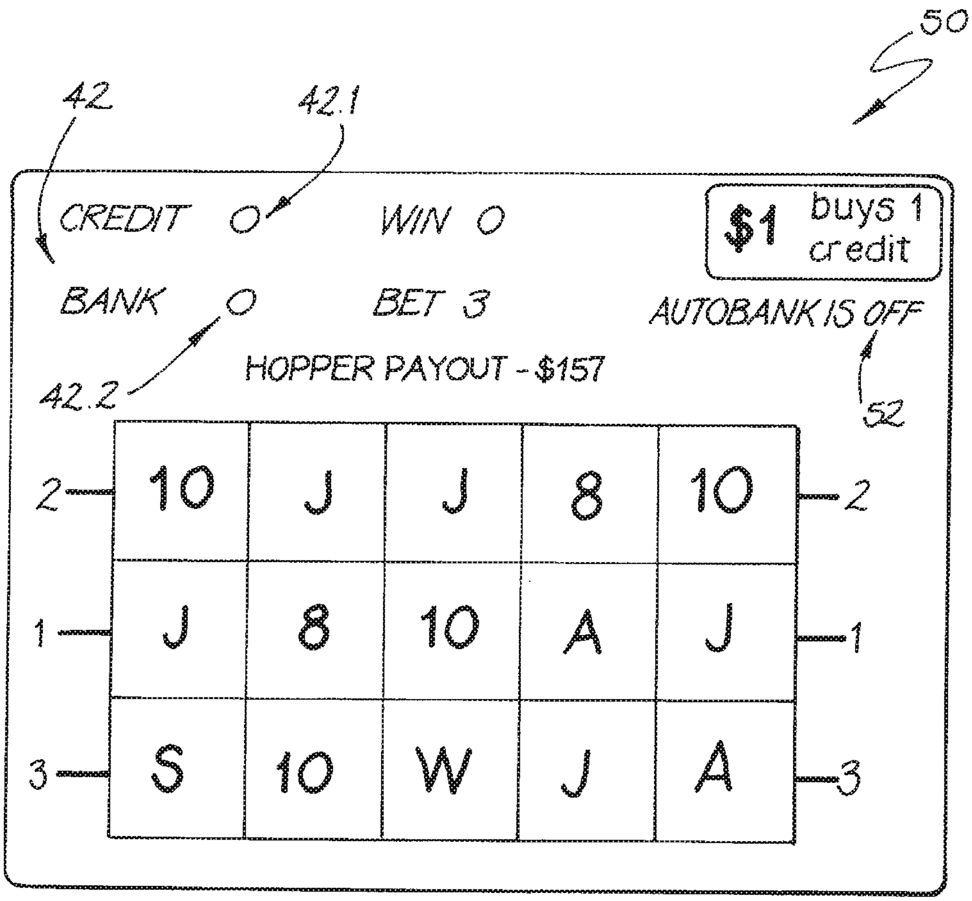
Figure 4:
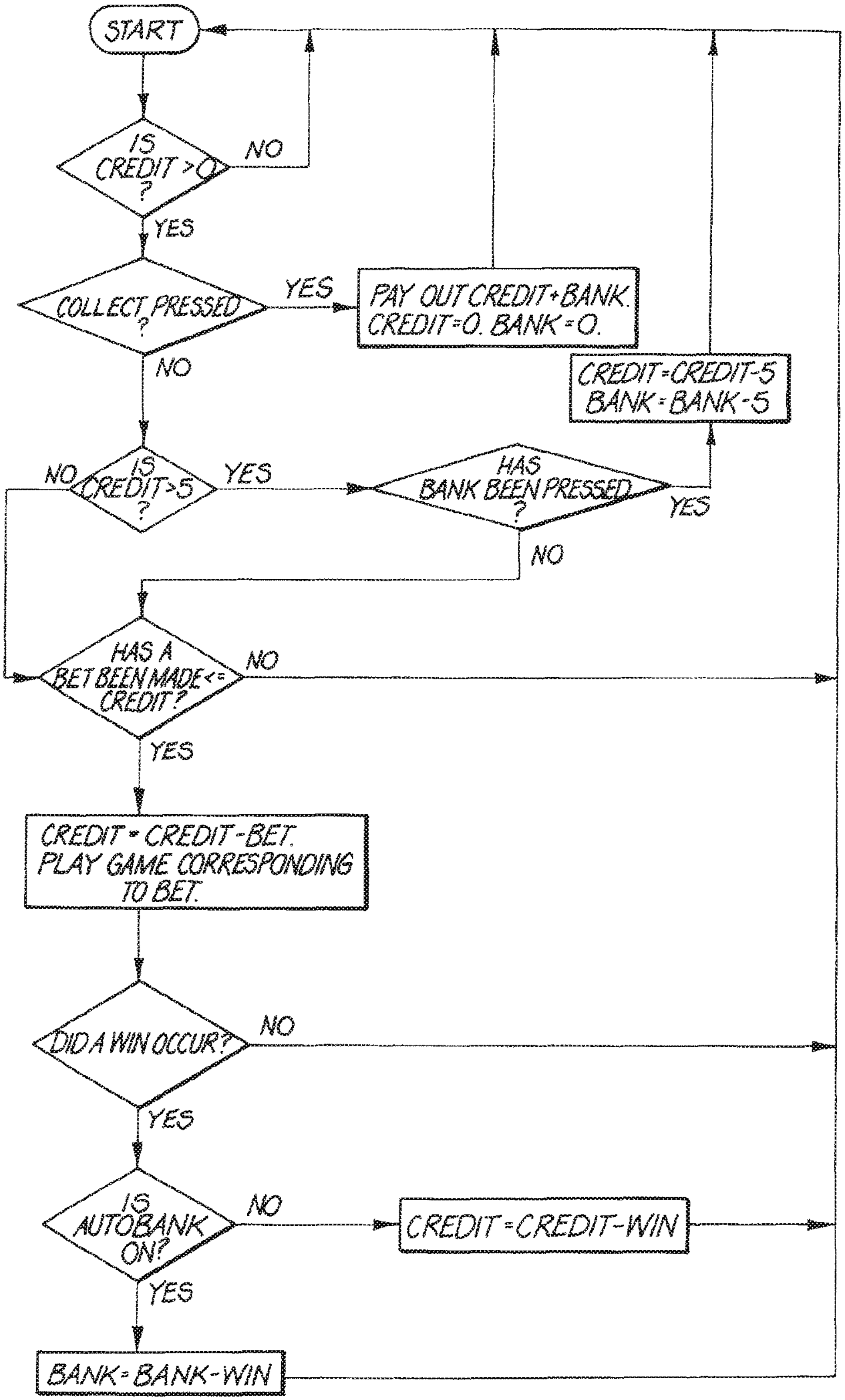
FIG. 4 shows a flow chart of one embodiment of a game sequence of the gaming machine.
Figure 5:
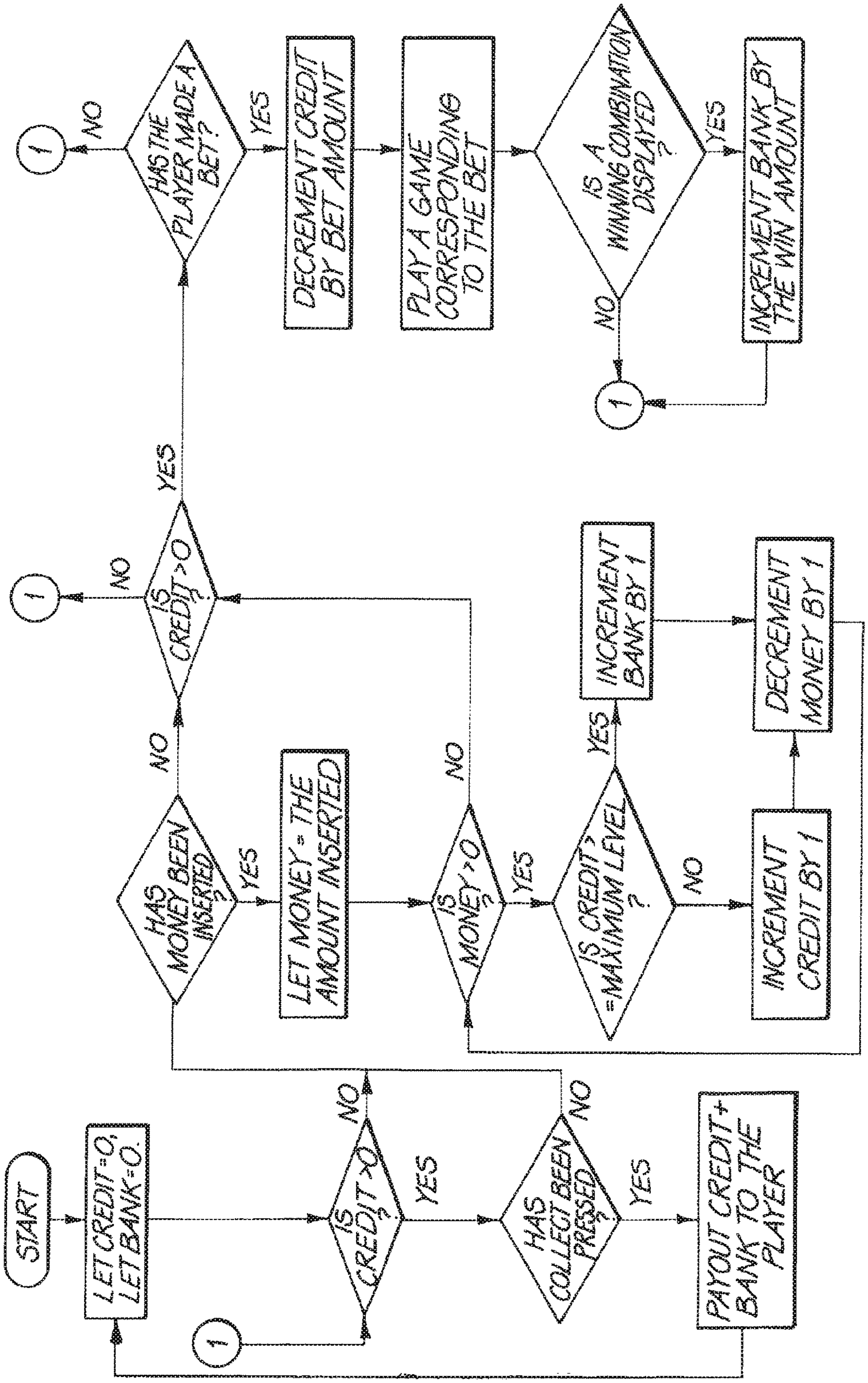
FIG. 5 shows a flow chart of a second embodiment of a game sequence of the gaming machine.

For the following game, as shown in FIG. 3*f* of the drawings, the player bets two credits per line on each of the three paylines. This time, the player does not achieve any wins.

As the player only has one credit left and does not wish to insert more credits, the player reduces the bet to one credit per line on the first payline. Also, as the player wishes to continue playing, the player toggles the button 48 so that the autobank feature is off as shown by the message 52 in FIG. 3*g* of the drawings.

As a result of three kings appearing on payline one, the player wins twenty credits. As the autobank feature is now off, these wins are credited to the credit meter 42.1. It is to be noted that, only as payline one was active, the four eights appearing on payline two do not pay any prize.

The player then decides that he or she only wishes to have five dollars to gamble with and wishes to bank the remaining fifteen dollars. The bank button 44 is pressed until only a credit of five dollars remains as shown on the credit meter 42.1 in FIG. 3*h* of the drawings.

The player then makes a bet of one credit per line on each of the three paylines but does not win anything. After this, the player decides to collect the money and presses the Collect button on the gaming machine 10. The two credits remaining on the credit meter 42.1 are paid out together with the one hundred and fifty five credits on the bank meter 42.2.

Hence, it is an advantage of the invention that a feature is added to the gaming machine which, the applicant believes, will encourage responsible gaming.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A gaming machine, comprising:
- a credit meter configured to maintain a credit balance;
- a bank meter configured to maintain a bank balance;
- a display configured to display representations of a wagering game of a current gaming session, the credit balance, and the bank balance;
- a player interface configured to receive inputs from a player; and
- a game controller configured to:
  - in response to inputs received from the player at the player interface, control play of a plurality of wagering games of the current gaming session;
  - update the credit balance of the credit meter during the current gaming session depending on a wager placed on each wagering game of the current gaming session;
  - automatically credit wins during the current gaming session to the bank balance of the bank meter;
  - prevent credits of the bank balance from being transferred to the credit balance of the credit meter or wagered during the current gaming session; and
  - dispense the credit balance and the bank balance from the credit meter and the bank meter of the gaming machine to the player after termination of the current game session.

2. The gaming machine of claim 1, wherein the game controller is further configured to transfer a predetermined amount of credits from the credit balance of the credit meter to the bank balance of the bank meter in response to each activation of a bank button of the player interface.

3. The gaming machine of claim 1, wherein the game controller is further configured to transfer a selectable amount of credits from the credit balance of the credit meter to the bank balance of the bank meter in response to each activation of a bank button of the player interface.

4. The gaming machine of claim 2, wherein the bank button is provided via a touch screen of the player interface.

5. The gaming machine of claim 1, wherein the game controller is further configured to transfer any credits above a predefined threshold from the credit balance of the credit meter to the bank balance of the bank meter.

6. The gaming machine of claim 1, wherein the game controller is further configured to automatically credit all winnings during the current gaming session to the bank balance of the bank meter.

7. The gaming machine of claim 1, wherein the game controller is further configured to:
- automatically credit winnings during the current gaming session that are below a threshold value to the credit balance of the credit meter; and
- automatically credit winnings during the current gaming session that are above the threshold value to the bank balance of the bank meter.

8. A method of operating a gaming machine, comprising:
maintaining a credit balance with a credit meter of the gaming machine;
maintaining a bank balance with a bank meter of the gaming machine;
displaying representations of a wagering game of a current gaming session, the credit balance, and the bank balance on a display of the gaming machine;
in response to inputs received from a player interface of the gaming machine, controlling play of a plurality of wagering games of the current gaming session;
updating the credit balance of the credit meter during the current gaming depending on a wager placed on each wagering game of the current gaming session;
automatically crediting wins during the current gaming session to the back balance of the bank meter;
preventing credits of the bank balance being transferred to the credit balance or wagered during the current gaming session; and
dispensing the credit balance and the bank balance from the credit meter and the bank meter of the gaming machine to a player of the gaming machine after termination of the current gaming session.

9. The method of claim 8, further comprising transferring a predetermined amount of credits from the credit balance of the credit meter to the bank balance of the bank meter in response to each activation of a bank button of the player interface.

10. The method of claim 8, further comprising transferring a selectable amount of credits from the credit balance of the credit meter to the bank balance of the bank meter in response to each activation of a bank button of the player interface.

11. The method of claim 10, further comprising:
displaying the bank button via a touch screen of the player interface; and
receiving activations of the bank button via the touch screen.

12. The method of claim 8, further comprising transferring any credits above a predefined threshold from the credit balance of the credit meter to the bank balance of the bank meter.

13. The method of claim 8, further comprising automatically crediting all winnings during the gaming session to the bank balance of the bank meter.

14. The method of claim 8, further comprising:
automatically crediting winnings during the current gaming session that are below a threshold value to the credit balance of the credit meter; and
automatically crediting winnings during the current gaming session that are above the threshold value to the bank balance of the bank meter.

15. The method of claim 8, further comprising terminating the current gaming session in response the credit balance of the credit meter reaching zero.

16. A non-transitory computer readable medium, comprising a program that in response to being executed by a game controller of a gaming machine, causes the game controller to:
maintain a credit balance with a credit meter of the gaming machine;
maintain a bank balance with a bank meter of the gaming machine;
display representations of a wagering game of a current gaming session, the credit balance, and the bank balance on a display of the gaming machine;
in response to inputs received from a player interface of the gaming machine, control play of a plurality of wagering games of the current gaming session;
update the credit balance of the credit meter during the current gaming depending on a wager placed on each wagering game of the current gaming session,
automatically credit wins during the current gaming session to the bank balance of the bank meter;
prevent credits of the bank balance being transferred to the credit balance or wagered during the current gaming session; and
dispense the credit balance and the bank balance from the credit meter and the bank meter of the gaming machine to a player of the gaming machine after termination of the current gaming session.

17. The non-transitory computer readable medium of claim 16, wherein the program further causes the game controller to transfer a predetermined amount of credits from the credit balance of the credit meter to the bank balance of the bank meter in response to each activation of a bank button of the player interface.

18. The non-transitory computer readable medium of claim 16, wherein the program further causes the game controller to transfer any credits above a predefined threshold from the credit balance of the credit meter to the bank balance of the bank meter.

19. The non-transitory computer readable medium of claim 16, wherein the program further causes the game controller to automatically credit all winnings during the gaming session to the bank balance of the bank meter.

20. The non-transitory computer readable medium of claim 16, wherein the program further causes the game controller to:
automatically credit winnings during the current gaming session that are below a threshold value to the credit balance of the credit meter; and
automatically credit winnings during the current gaming session that are above the threshold value to the bank balance of the bank meter.

* * * * *